(12) United States Patent
Lee et al.

(10) Patent No.: US 11,593,587 B2
(45) Date of Patent: Feb. 28, 2023

(54) OBJECT DETECTION SYSTEM AND AN OBJECT DETECTION METHOD

(71) Applicant: ELECTRONICS AND TELECOMMUNICATIONS RESEARCH INSTITUTE, Daejeon (KR)

(72) Inventors: Youngwan Lee, Daejeon (KR); Hyungil Kim, Daejeon (KR); Jongyoul Park, Daejeon (KR); Yu Seok Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 14 days.

(21) Appl. No.: 17/325,701

(22) Filed: May 20, 2021

(65) Prior Publication Data

US 2021/0365724 A1 Nov. 25, 2021

(30) Foreign Application Priority Data

May 20, 2020 (KR) ........................ 10-2020-0060095

(51) Int. Cl.
*G06K 9/62* (2022.01)
*G06T 3/00* (2006.01)
(Continued)

(52) U.S. Cl.
CPC .......... *G06K 9/6232* (2013.01); *G06K 9/629* (2013.01); *G06K 9/6261* (2013.01);
(Continued)

(58) Field of Classification Search
None
See application file for complete search history.

(56) References Cited

U.S. PATENT DOCUMENTS 11,100,352 B2 8/2021 Lee et al.
2017/0154425 A1 6/2017 Pierce et al.
(Continued)

FOREIGN PATENT DOCUMENTS

CN 110287849 A * 9/2019 ......... G06K 9/00744
CN 111666822 A * 9/2020
(Continued)

OTHER PUBLICATIONS

Li et al., SCAttNet: Semantic Segmentation Network With Spatial and Channel Attention Mechanism for High-Resolution Remote Sensing Images, IEEE Geoscience and Remote Sensing Letters, (Year: 2020).*

(Continued)

*Primary Examiner* — Mohammed Rachedine
(74) *Attorney, Agent, or Firm* — Kile Park Reed & Houtteman PLLC (57) ABSTRACT

Provided are an object detection system and an object detection method. An object detection system may include a feature map extraction module configured to receive an image for object detection and extract a feature map having multiple resolutions for the image; a bounding box detection module configured to classify a bounding box by applying a first group of convolutional layers to the feature map, and predict the bounding box by applying a second group of convolutional layers to the feature map; and a mask generation module configured to generate a mask for the shape of the object in the bounding box using the feature map.

11 Claims, 9 Drawing Sheets

(51) Int. Cl.
- *G06T 7/60* (2017.01)
- *G06T 7/73* (2017.01)
- *G06T 7/194* (2017.01)
- *G06T 7/11* (2017.01)
- *G06T 7/246* (2017.01)
- *G06T 7/223* (2017.01)
- *G06V 10/25* (2022.01)
- *G06V 10/82* (2022.01)

(52) U.S. Cl.
CPC .......... *G06K 9/6279* (2013.01); *G06T 3/0093* (2013.01); *G06T 7/60* (2013.01); *G06T 7/73* (2017.01); *G06T 2207/20016* (2013.01)

(56) References Cited

U.S. PATENT DOCUMENTS

| | | |
|---|---|---|
| 2018/0123797 A1 | 5/2018 | Noh et al. |
| 2018/0268571 A1 | 9/2018 | Park et al. |
| 2019/0057507 A1 | 2/2019 | El-Khamy et al. |
| 2019/0385026 A1 | 12/2019 | Richeimer et al. |
| 2020/0111214 A1* | 4/2020 | Chen ................ G06V 10/82 |
| 2020/0160975 A1* | 5/2020 | Yao ................ G06V 30/19173 |
| 2020/0175700 A1* | 6/2020 | Zhang ................ G06T 7/11 |
| 2020/0349411 A1* | 11/2020 | Luo ................ G06N 3/0481 |

FOREIGN PATENT DOCUMENTS

| | | | |
|---|---|---|---|
| KR | 20200049451 A | * | 2/2019 |
| KR | 20200049451 A | * | 3/2019 |
| KR | 10-2020-0049451 A | | 5/2020 |

OTHER PUBLICATIONS

Zhi Tian et al., "FCOS: Fully Convolutional One-Stage Object Detection", H2019 IEEE/CVF International Conference on Computer Vision (ICCV); pp. 1-13.

Haifeng Li et al., "SCAttNet: Semantic Segmentation Network with Spatial and Channel Attention Mechanism for High-Resolution Remote Sensing Images", IEEE of Latex Class Files, vol. 14, No. 8, Aug. 2019.

* cited by examiner

OBJECT DETECTION SYSTEM AND AN OBJECT DETECTION METHOD

CROSS-REFERENCE TO RELATED APPLICATION

This application claims priority to and the benefit of Korean Patent Application No. 10-2020-0060095 filed in the Korean Intellectual Property Office on May 20, 2020, the entire contents of which are incorporated herein by reference.

BACKGROUND OF THE DISCLOSURE

(a) Field of the Disclosure

The present disclosure relates to an object detection system and an object detection method.

(b) Description of the Related Art

An image recognition system or an object detection system for detecting an object in an image may perform detection of a single object or a plurality of objects from a digital image or video frame, and semantic segmentation. Here, object detection may mean classifying a specific object within a given image and estimating a position and size of the object within the image in the form of a bounding box. In addition, semantic segmentation may mean subdividing an exact shape of the object in pixel units within the object box detected as described above.

As a technology for object detection, there is an object detection technology based on a pre-defined anchor-box. In this method, learning and detection are performed by defining a difference between an anchor-box and a ground truth (GT) box defined at a fixed position and various sizes/ratios as a loss function. However, this method needs to perform hyper-parameter tuning related to different anchor-boxes every time for each training data, and an imbalance of positive/negative samples may occur due to a myriad of anchor-box candidates compared to the GT box.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide an object detection system and an object detection method having advantages of overcoming the limitations of object detection based on a predefined anchor-box, by performing object detection and segmentation based on points.

An example embodiment of the present disclosure provides an object detection system including a feature map extraction module configured to receive an image for object detection and extract a feature map having multiple resolutions for the image; a bounding box detection module configured to classify a bounding box by applying a first group of convolutional layers to the feature map, and predict the bounding box by applying a second group of convolutional layers to the feature map; and a mask generation module configured to generate a mask for the shape of the object in the bounding box using the feature map.

According to an embodiment of the present disclosure, the feature map extraction module may construct a feature pyramid that combines information of feature maps for each of multiple layers from the image, and extract the feature map having the multiple resolutions by using the feature pyramid.

According to an embodiment of the present disclosure, the feature map extraction module may extract the feature maps for each of the multiple layers from a backbone network, and generate the feature pyramid by adding the extracted feature maps for each of the multiple layers in reverse order.

According to an embodiment of the present disclosure, the bounding box detection module may classify the bounding box using a binary classifier.

According to an embodiment of the present disclosure, the bounding box detection module may set offsets in multiple directions based on the center point of the object and then estimate the position and the size of the bounding box.

According to an embodiment of the present disclosure, the bounding box detection module may adjust the reliability of the predicted bounding box based on the confidence score for the classification of the bounding box and the centeredness indicating the degree to which the predicted bounding box coincides with the ground truth (GT).

According to an embodiment of the present disclosure, the mask generation module may extract an area corresponding to the bounding box from the feature map, and then perform warping with a feature map having a preset resolution.

According to an embodiment of the present disclosure, the mask generation module may obtain a convolutional feature map by applying a convolutional layer to the warped feature map, and combine a maximum pooling feature map and an average pooling feature map by performing maximum pooling and average pooling on the convolutional feature map.

According to an embodiment of the present disclosure, the mask generation module may obtain an attention map by applying a nonlinear function to the combined maximum pooling feature map and average pooling feature map.

According to an embodiment of the present disclosure, the mask generation module may multiply the attention map and the convolutional feature map, and perform a binary classification on the multiplied result to generate the mask.

Another embodiment of the present disclosure provides an object detection method including receiving an image for object detection; extracting feature maps for each of multiple layers from a backbone network; generating a feature pyramid that combines information of feature maps for each of multiple layers by adding the extracted feature maps for each of the multiple layers in reverse order; extracting a feature map having multiple resolutions for the image by using the feature pyramid; and generating a mask for the shape of the object using the feature map having multiple resolutions.

According to an embodiment of the present disclosure, the generating the mask may include extracting an area corresponding to the bounding box from the feature map, and performing warping with a feature map having a preset resolution.

According to an embodiment of the present disclosure, the generating the mask may include obtaining a convolutional feature map by applying a convolutional layer to the warped feature map; and combining a maximum pooling feature map and an average pooling feature map by performing maximum pooling and average pooling on the convolutional feature map.

According to an embodiment of the present disclosure, the generating the mask may include obtaining an attention map by applying a nonlinear function to the combined maximum pooling feature map and average pooling feature map.

According to an embodiment of the present disclosure, the generating the mask may include multiplying the attention map and the convolutional feature map, and performing a binary classification on the multiplied result to generate the mask.

Yet another embodiment of the present disclosure provides an object detection method including applying a first group of convolutional layers to a feature map of an image for object detection; classifying the bounding box using a binary classifier; applying a second group of convolutional layers to the feature map; setting offsets in multiple directions based on the center point of the object and estimating the position and the size of the bounding box; adjusting the reliability of the predicted bounding box based on the confidence score for the classification of the bounding box and the centeredness indicating the degree to which the predicted bounding box coincides with the ground truth (GT); and generating a mask for the shape of the object in the bounding box using the feature map.

According to an embodiment of the present disclosure, the generating the mask may include extracting an area corresponding to the bounding box from the feature map, and performing warping with a feature map having a preset resolution.

According to an embodiment of the present disclosure, the generating the mask may include obtaining a convolutional feature map by applying a convolutional layer to the warped feature map; and combining a maximum pooling feature map and an average pooling feature map by performing maximum pooling and average pooling on the convolutional feature map.

According to an embodiment of the present disclosure, the generating the mask may include obtaining an attention map by applying a nonlinear function to the combined maximum pooling feature map and average pooling feature map.

According to an embodiment of the present disclosure, the generating the mask may include multiplying the attention map and the convolutional feature map, and performing a binary classification on the multiplied result to generate the mask.

DETAILED DESCRIPTION OF THE EMBODIMENTS

Hereinafter, embodiments of the present disclosure will be described in detail with reference to the accompanying drawings so that those of ordinary skill in the art may easily implement the present disclosure. However, the present disclosure may be implemented in various different ways and is not limited to the embodiments described herein.

In the drawings, parts irrelevant to the description are omitted in order to clearly describe the present disclosure, and like reference numerals are assigned to like elements throughout the specification.

Throughout the specification and claims, unless explicitly described to the contrary, the word "comprise", and variations such as "comprises" or "comprising", will be understood to imply the inclusion of stated elements but not the exclusion of any other elements. In addition, terms such as " . . . unit", " . . . group", and "module" described in the specification mean a unit that processes at least one function or operation, and it can be implemented as hardware or software or a combination of hardware and software.

An object detection system described herein may be implemented with one or more computing devices. The computing device may be, for example, a smart phone, a smart watch, a smart band, a tablet computer, a notebook computer, a desktop computer, a server, etc., but the scope of the present disclosure is not limited thereto, and may include any type of computer device having a memory and a processor capable of storing and executing computer instructions.

The functions of the object detection system may be all implemented on a single computing device, or may be implemented separately on a plurality of computing devices. For example, the plurality of computing devices may include a first computing device and a second computing device, some functions of the object detection system are implemented on the first computing device, and some other functions of the object detection system are implemented on the second computing device. And, the first computing device and the second computing device may communicate with each other through a network.

Here, the network may include a wireless network including a cellular network, a Wi-Fi network, a Bluetooth network, etc., a wired network including a local area network (LAN), a wide local area network (WLAN), etc., or a combination of a wireless network and a wired network, but the scope of the present disclosure is not limited thereto.

Figure 1:
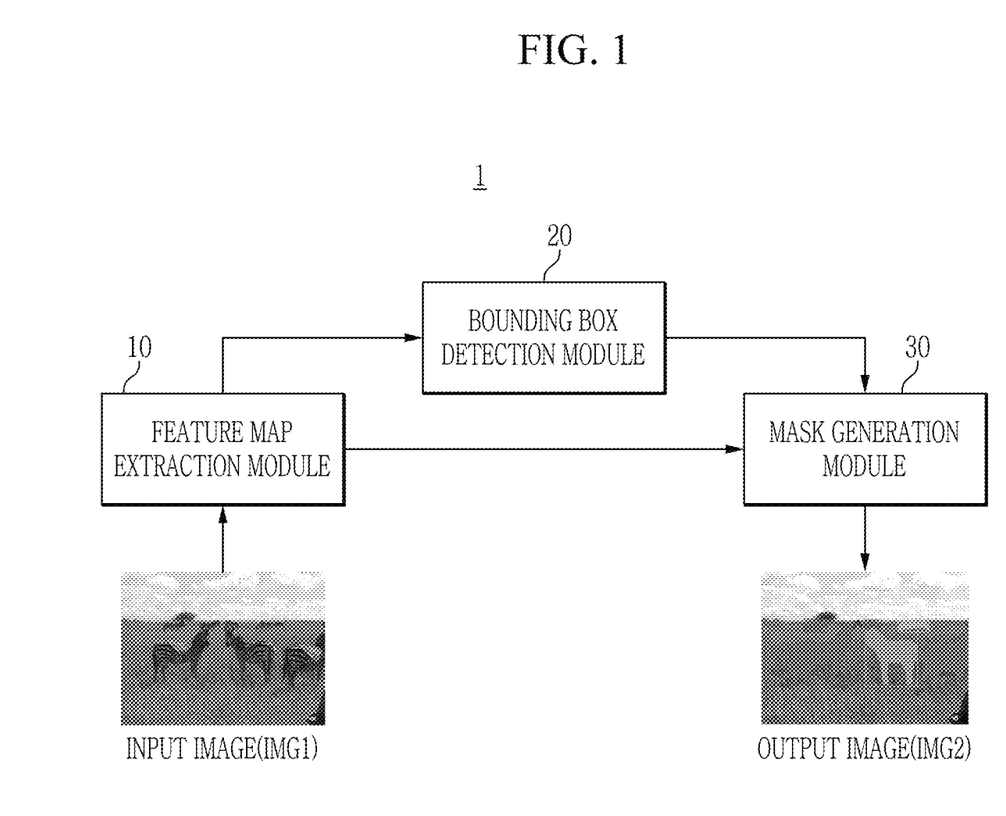
FIG. 1 is a block diagram illustrating an object detection system according to an embodiment of the present disclosure.

FIG. 1 is a block diagram illustrating an object detection system according to an embodiment of the present disclosure.

Referring to FIG. 1, an object detection system 1 according to an embodiment of the present disclosure may perform object detection and segmentation based on points. Here, segmentation may mean semantic segmentation, specifically, the object detection system 1 may perform pixel-wise object segmentation on an object in an input image, and generate an object detection result by using specific pixels in the input image belonging to an object classification and detection confidence score, in the form of a mask.

In this embodiment, the object detection system 1 may include a feature map extraction module 10, a bounding box detection module 20, and a mask generation module 30.

The input image IMG1 may be, for example, a grassland landscape image, and zebras and other animals, and vegetation may be expressed in the grassland landscape image. The object detection system 1 may detect animals such as zebras or vegetation from the input image IMG1.

The feature map extraction module 10 may receive an image for object detection, that is, an input image IMG1, and extract a feature map having multiple resolutions for the input image IMG1.

Here, the feature map having multiple resolutions may be generated in a backbone network composed of convolutional layers, and for example, the feature map having multiple resolutions or scales may be extracted through an operation such as upsampling or downsampling.

Each of the feature maps for each layer having multiple resolutions or scales generated in the backbone network may have different feature information for each layer, and after constructing a feature pyramid for combining these different feature information, the feature map having multiple resolutions may be extracted based on the feature pyramid.

That is, in some embodiments of the present disclosure, the feature map extraction module 10 may construct a feature pyramid that combines information of feature maps of each layer from the input image IMG1, and use the feature pyramid to extract the feature map having multiple resolutions.

In particular, the feature pyramid may be configured by extracting feature maps for each layer from a backbone network and adding the feature maps for each layer in reverse order, but the scope of the present disclosure is not limited thereto.

The bounding box detection module 20 may classify (or identify) a bounding box by applying a first group of convolution layers to the feature map extracted by the feature map extraction module 10.

Here, the first group of convolutional layers may include a plurality of convolutional layers, and receive the feature map extracted by the feature map extraction module 10 as an input, and its output can be provided as an input to a task that performs classification of bounding boxes.

In some embodiments of the present disclosure, the bounding box detection module 20 may classify a bounding box using a binary classifier.

In addition, the bounding box detection module 20 may predict the bounding box by applying the second group of convolution layers to the feature map extracted by the feature map extraction module 10.

Here, the second group of convolutional layers may include a plurality of convolutional layers, and receive the feature map extracted by the feature map extraction module 10 as an input, and its output can be provided as an input to a task that performs classification of bounding boxes.

In some embodiments of the present disclosure, the bounding box detection module 20 may set offsets in multiple directions based on the center point of the object, and then estimate the position and the size of the bounding box.

In addition, in some embodiments of the present disclosure, the bounding box detection module 20 may adjust the reliability of the predicted bounding box based on the confidence score for the classification of the bounding box and the centeredness indicating the degree to which the predicted bounding box coincides with the ground truth (GT).

In this way, the bounding box detection module 20 may predict or determine a bounding box for performing object detection basis on points (i.e., based on center points) without using a predefined anchor-box.

The mask generation module 30, using the feature map extracted by the feature map extraction module 10, may generate a mask for the shape of the object in the bounding box predicted by the bounding box detection module 20 to output an output image IMG2.

In some embodiments of the present disclosure, the mask generation module 30 may extract an area corresponding to the bounding box from the feature map, and then perform warping with a feature map having a preset resolution, and the mask generation module 30 may obtain a convolutional feature map by applying a convolutional layer to the warped feature map, and combine a maximum pooling feature map and an average pooling feature map by performing maximum pooling and average pooling on the convolutional feature map.

In addition, the mask generation module 30 may obtain an attention map by applying a nonlinear function to the combined maximum pooling feature map and average pooling feature map, and after that, the mask generation module 30 may multiply the attention map and the convolutional feature map, and perform a binary classification on the multiplied result to generate the mask.

Accordingly, in the output image IMG2 output from the mask generation module 30, for example, all pixels related to zebras in the grassland landscape image can be labeled with "zebra", and all pixels related to other animals can be labeled with the name of each corresponding animal. In addition, in the output image IMG2, a mask for identifying pixels corresponding to the object may be generated, for example, when four "zebras" are detected, the output image IMG2 may include four masks.

According to the present embodiment, by performing object detection and segmentation based on points without using a predefined anchor box that requires a high computational amount and memory usage, it is possible to achieve efficiency in terms of computational amount and memory occupancy. Furthermore, it is possible to implement real-time object detection and segmentation in various fields based on platforms with little computing power (for example, embedded platforms) such as fields of robots, drones, and autonomous vehicles.

Figure 2:
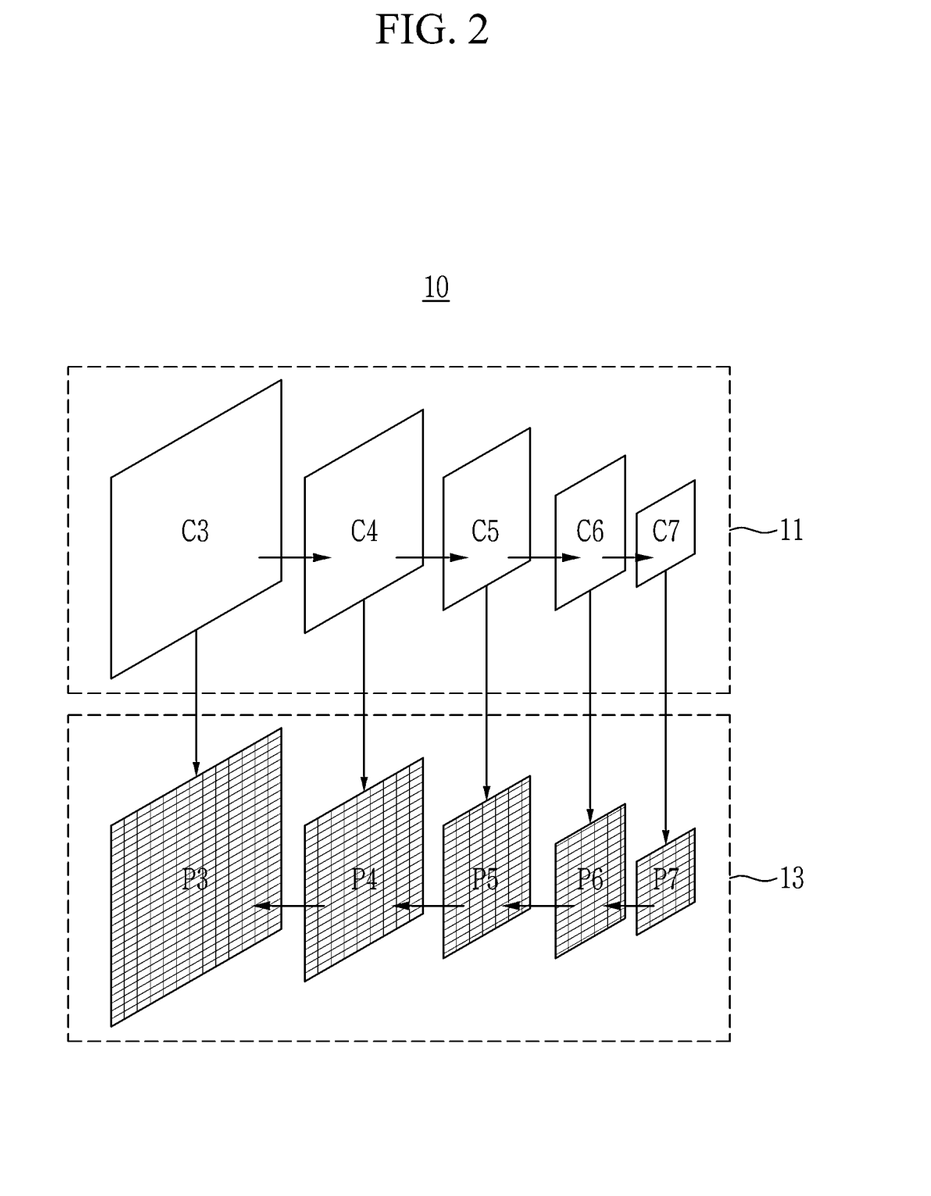
FIG. 2 illustrates a feature map extraction module of an object detection system according to an embodiment of the present disclosure.

FIG. 2 illustrates a feature map extraction module of an object detection system according to an embodiment of the present disclosure.

Referring to FIG. 2, a feature map extraction module 20 of an object detection system according to an embodiment of the present disclosure may generate a feature pyramid 13 from a backbone network 11.

The backbone network 11 may include a plurality of convolutional layers C3 to C7. And, the feature pyramid 13 may be configured by adding feature maps P3 to P7 corresponding to each of the plurality of convolutional layers C3 to C7. In particular, the feature maps P3 to P7 may be added to the plurality of convolutional layers C3 to C7 in the reverse order, so that the feature pyramid 13 for combining information of each of the feature maps P3 to P7 may be configured.

Accordingly, the feature map extraction module 10 may extract a feature map having multiple resolutions using the feature pyramid 13 and then provide it to the bounding box detection module 20 and the mask generation module 30.

Of course, the present disclosure is not limited to the method described with respect to FIG. 2, and the feature map extraction module 10 may extract the feature map to be provided to the bounding box detection module 20 and the mask generation module 30, from the input image IMG1 in an arbitrary manner other than the method.

Figure 3:
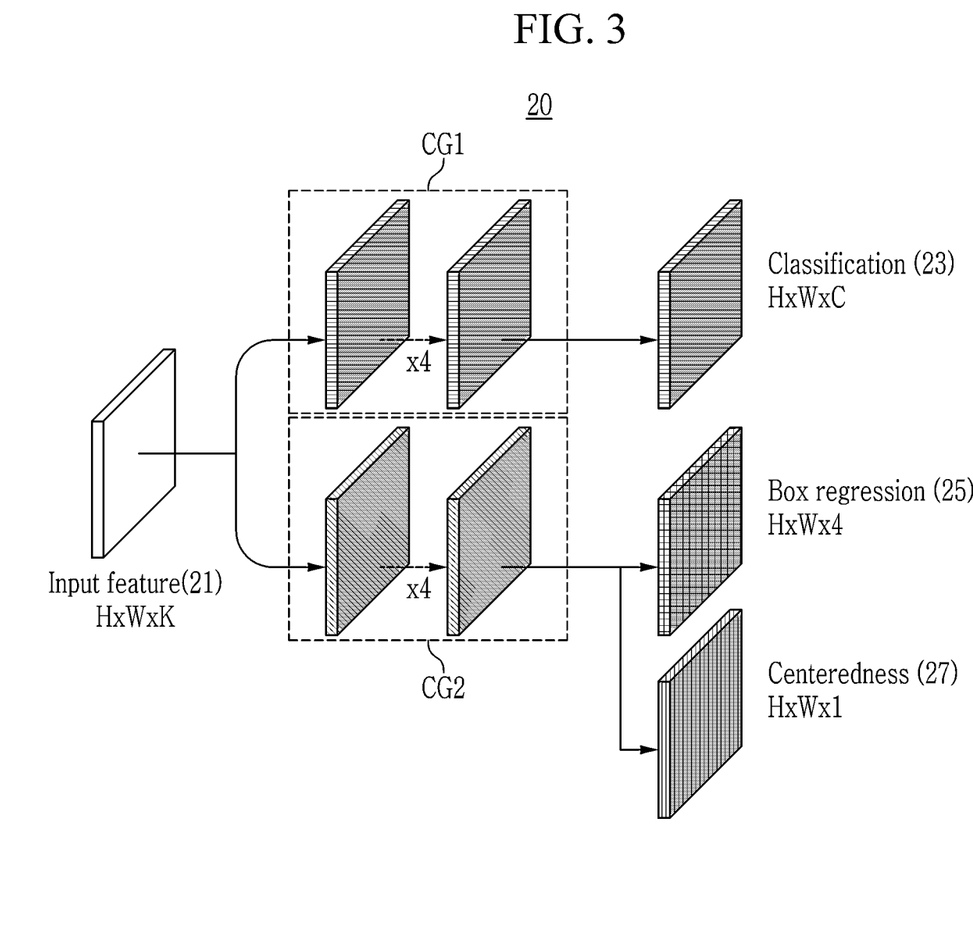
FIG. 3 and FIG. 4 illustrate a bounding box detection module of an object detection system according to an embodiment of the present disclosure.
Figure 4:
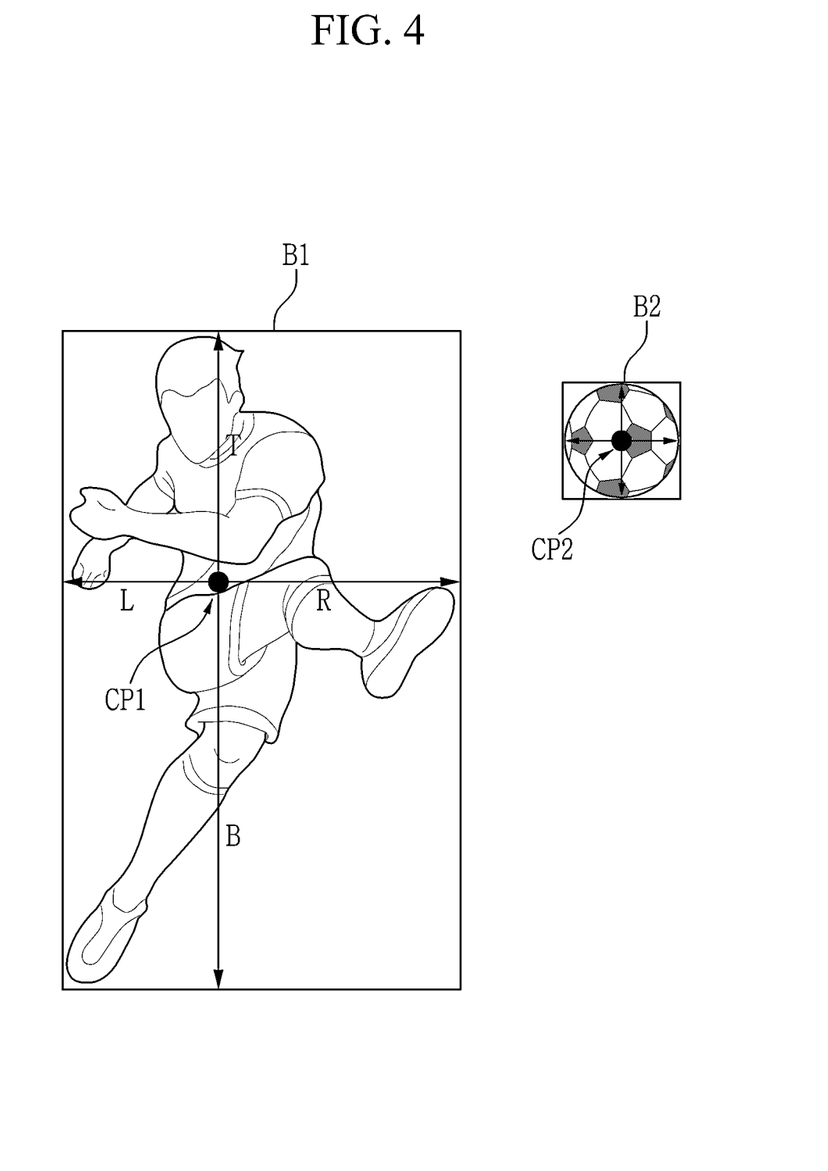

FIG. 3 and FIG. 4 illustrate a bounding box detection module of an object detection system according to an embodiment of the present disclosure.

Referring to FIG. 3, a bounding box detection module 20 of an object detection system according to an embodiment of the present disclosure may perform classification of the bounding box 23 by applying multiple groups of convolutional layers CG1 and CG2 to the input feature 21 corresponding to the feature map extracted by the feature map extraction module 10, or perform prediction (box regression) 25 of the bounding box based on the centeredness 27. Here, each of the plurality of groups of convolutional layers CG1 and CG2 may include a plurality of convolutional layers.

When the first group of convolution layers CG1 among the plurality of groups of convolution layers CG1 and CG2 is applied to the input feature 21, the result can be provided as input to the task that performs classification 23 of the bounding box. Then, the task that performs the classification 23 of the bounding box may classify the bounding box from the input feature 21 using, for example, a binary classifier.

On the other hand, when the second group of convolution layers CG2 among the plurality of groups of convolution layers CG1 and CG2 is applied to the input feature 21, the result can be provided as input to the task that performs prediction 25 of the bounding box. Then, the task that performs the prediction 25 of the bounding box may set offsets in multiple directions based on the center point of the object, and then estimate the position and the size of the bounding box.

Referring to FIG. 4 together, the task that performs the prediction 25 of the bounding box may set offsets in four directions: T, B, L, and R based on the central point CP1 of the object "person", and then estimate the position and the size of the bounding box B1 classified to surround the object "person".

Similarly, the task that performs the prediction 25 of the bounding box may set offsets in four directions: T, B, L, and R based on the central point CP2 of the object "soccer ball", and then estimate the position and the size of the bounding box B2 classified to surround the object "soccer ball".

In addition, the task that performs the prediction 25 of the bounding box may adjust the reliability of the predicted bounding box based on the centeredness 27, and the centeredness 27 may indicate the confidence score for the classification of the bounding box and the degree to which the predicted bounding box coincides with the ground truth (GT).

In this way, the bounding box detection module 20 may predict or determine a bounding box for performing object detection basis on points (i.e., based on center points) without using a predefined anchor-box.

Of course, the present disclosure is not limited to the method described with reference to FIG. 3 and FIG. 4, and the bounding box detection module 20 may predict or determine a bounding box for performing object detection based on points in an arbitrary manner other than the method.

Figure 5:
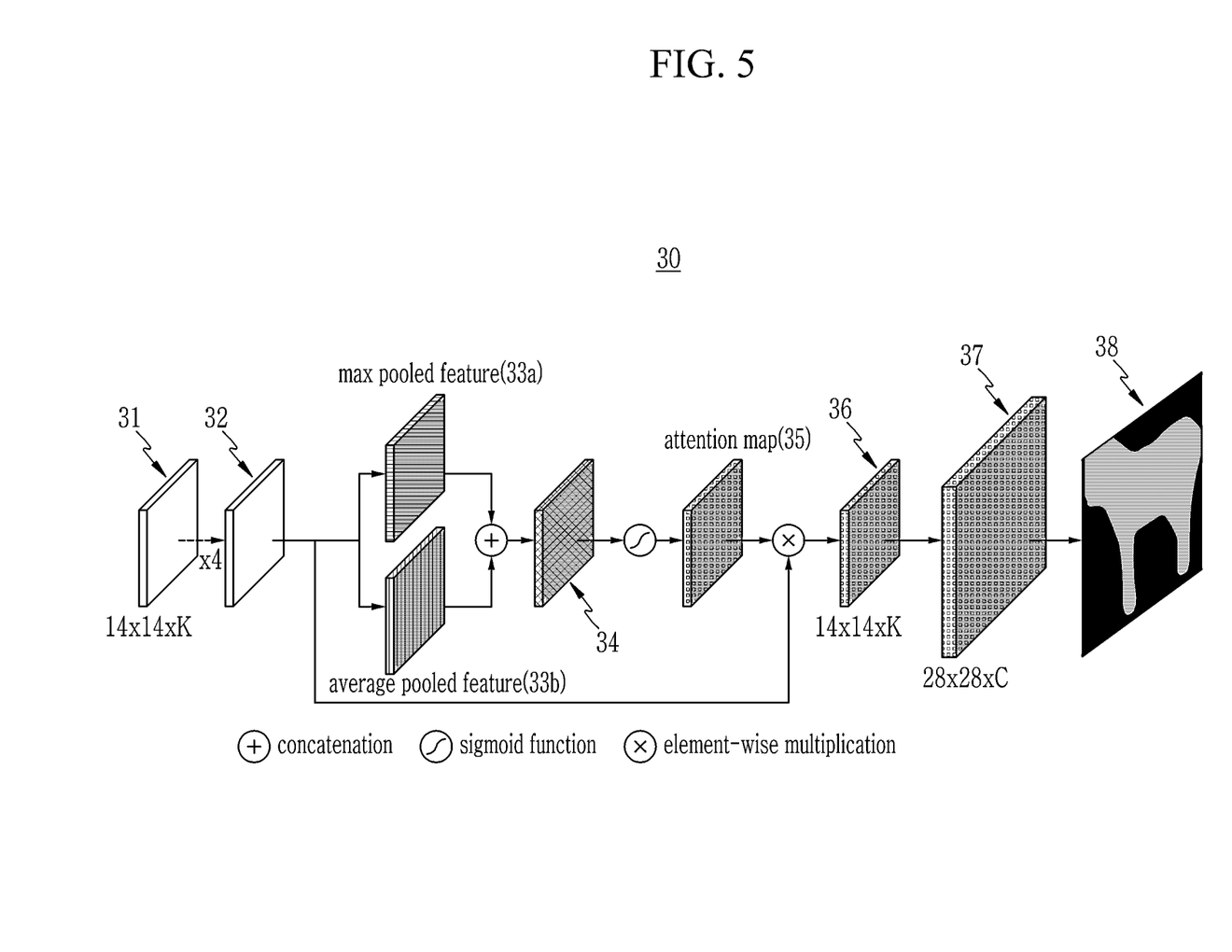
FIG. 5 illustrates a mask generation module of an object detection system according to an embodiment of the present disclosure.

FIG. 5 illustrates a mask generation module of an object detection system according to an embodiment of the present disclosure.

Referring to FIG. 5, the mask generation module 30 of the object detection system according to an embodiment of the present disclosure, using the feature map extracted by the feature map extraction module 10, may generate a mask 38 for the shape of the object in the bounding box predicted by the bounding box detection module 20.

To this end, the mask generation module 30 may extract an area corresponding to a bounding box from the feature map, and then performs warping with a feature map having a preset resolution, for example, 14×14 resolution. And, the mask generation module 30 may obtain a convolutional feature map 32 by applying a convolutional layer to the warped feature map 31, and generate a maximum pooling feature map 33a and an average pooling feature map 33b by performing maximum pooling and average pooling on the convolutional feature map 32.

Next, the mask generation module 30 may generate the combined maximum pooling feature map and average pooling feature map 34 by combining the maximum pooling feature map 33a and the average pooling feature map 33b, and obtain an attention map 35 by applying a nonlinear function, for example a sigmoid function to the combined maximum pooling feature map and average pooling feature map 34.

Next, the mask generation module 30 may multiply the attention map 35 and the convolutional feature map 32, then performs upsampling on the multiplied result 16 to obtain the upsampling result 37 of, for example 28×28 resolution, and perform a binary classification on the multiplied result to generate the mask 38.

Of course, the present disclosure is not limited to the method described with respect to FIG. 5, and the mask generation module 30, using the feature map extracted by the feature map extraction module 10, may generate a mask for the shape of the object in the bounding box predicted by the bounding box detection module 20 in an arbitrary manner other than the method.

Figure 6:
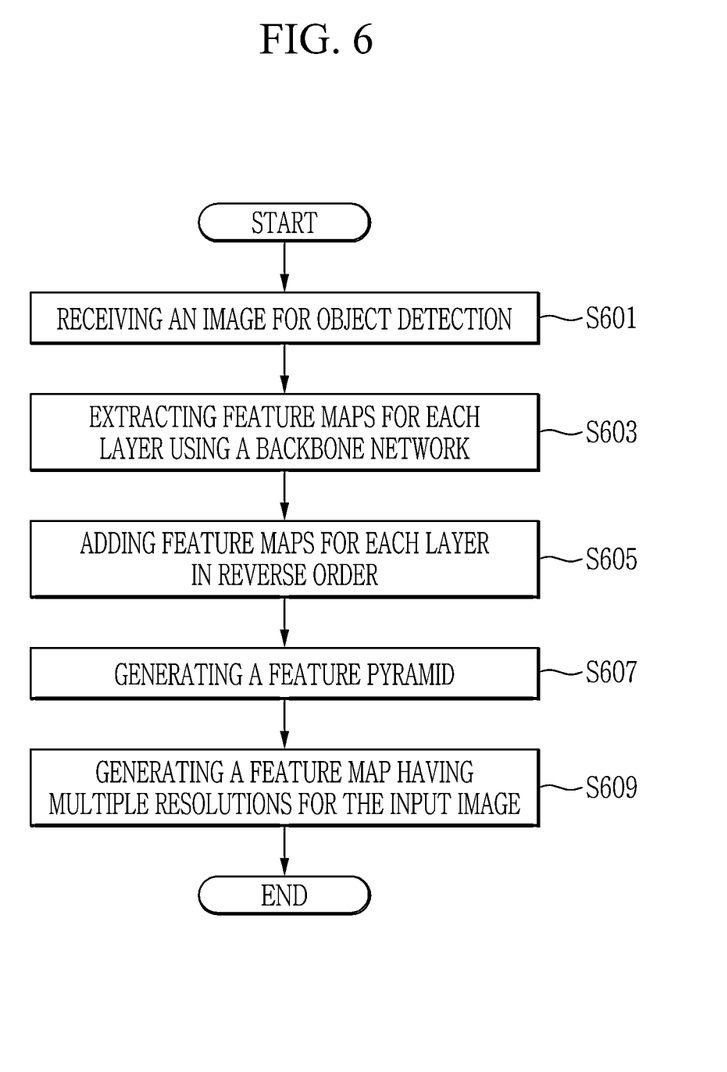
FIG. 6 is a flowchart illustrating an object detection method according to an embodiment of the present disclosure.

FIG. 6 is a flowchart illustrating an object detection method according to an embodiment of the present disclosure.

Referring to FIG. 6, an object detection method according to an embodiment of the present disclosure may include receiving an image for object detection (S601), extracting feature maps for each layer using a backbone network (S603), adding feature maps for each layer in reverse order (S605), generating a feature pyramid (S607), and generating a feature map having multiple resolutions for the input image (S609).

For more detailed information on the object detection method according to the present example embodiment, refer to the aforementioned descriptions in connection with FIG. 1 to FIG. 5.

Figure 7:
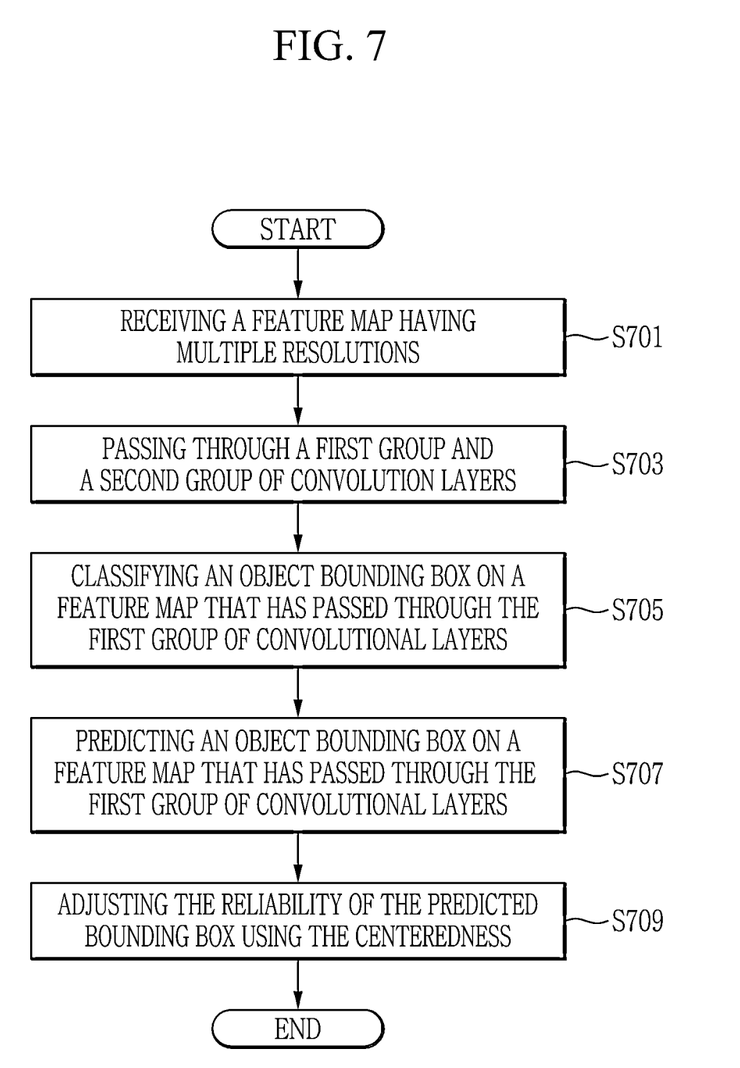
FIG. 7 is a flowchart illustrating an object detection method according to an embodiment of the present disclosure.

FIG. 7 is a flowchart illustrating an object detection method according to an embodiment of the present disclosure.

Referring to FIG. 7, an object detection method according to an embodiment of the present disclosure may include receiving a feature map having multiple resolutions (S701), passing through a first group and a second group of convolution layers (S703), classifying an object bounding box on a feature map that has passed through the first group of convolutional layers (S705), predicting an object bounding box on a feature map that has passed through the first group of convolutional layers (S707), and adjusting the reliability of the predicted bounding box using the centeredness (S709).

For more detailed information on the object detection method according to the present example embodiment, refer to the aforementioned descriptions in connection with FIG. 1 to FIG. 5.

Figure 8:
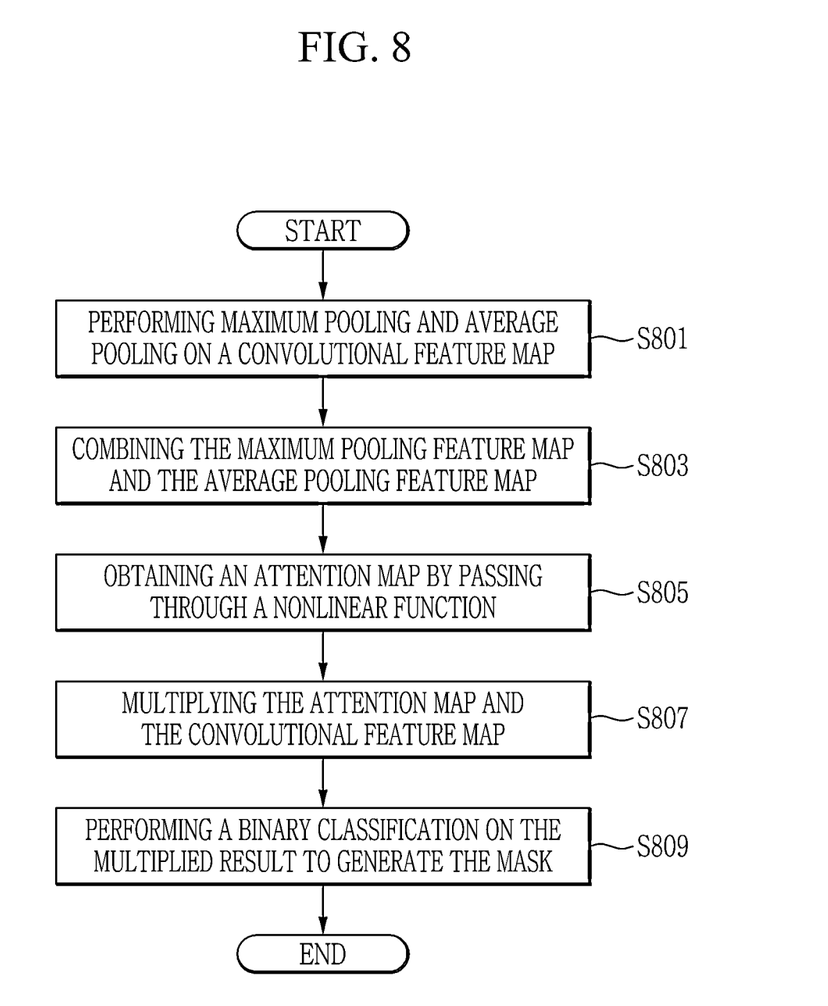
FIG. 8 is a flowchart illustrating an object detection method according to an embodiment of the present disclosure.

FIG. 8 is a flowchart illustrating an object detection method according to an embodiment of the present disclosure.

Referring to FIG. 8, an object detection method according to an embodiment of the present disclosure may include performing maximum pooling and average pooling on a convolutional feature map (S801), combining the maximum pooling feature map and the average pooling feature map (S803), obtaining an attention map by passing through a nonlinear function (S805), multiplying the attention map and the convolutional feature map (S807) and performing a binary classification on the multiplied result to generate the mask (S809).

For more detailed information on the object detection method according to the present example embodiment, refer to the aforementioned descriptions in connection with FIG. 1 to FIG. 5.

Figure 9:
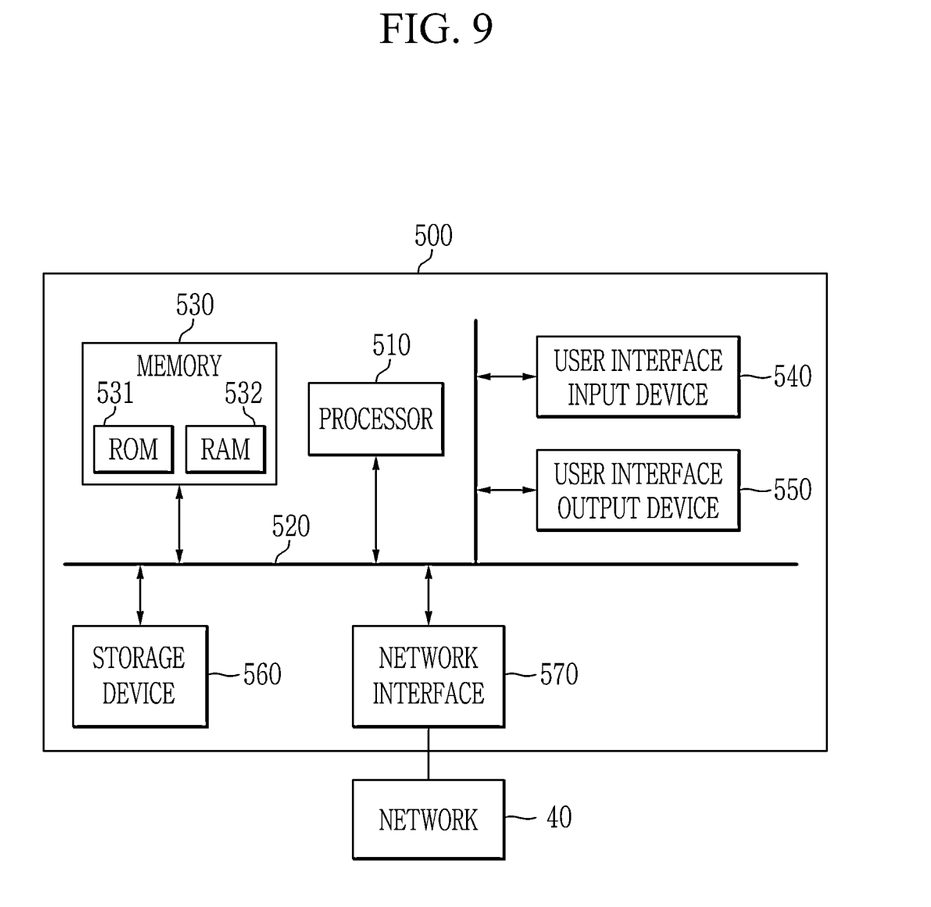
FIG. 9 is a block diagram illustrating a computing device for implementing an object detection system and an object detection method according to an embodiment of the present disclosure.

FIG. 9 is a block diagram of a computing device for implementing an object detection system and an object detection method according to an embodiment of the present disclosure.

Referring to FIG. 9, an object detection system and an object detection method according to an embodiment of the present disclosure may be implemented using a computing device 500.

The computing device 500 includes at least one of a processor 510, a memory 530, a user interface input device 540, a user interface output device 550, and a storage device 560 communicating through a bus 520. The computing device 500 may also include a network 40, such as a network interface 570 that is electrically connected to a wireless network. The network interface 570 may transmit or receive signals with other entities through the network 40.

The processor 510 may be implemented in various types such as an application processor (AP), a central processing unit (CPU), and a graphic processing unit (GPU), and may be any semiconductor device which executes instructions stored in the memory 530 or the storage device 560. The processor 510 may be configured to implement the functions and methods described in FIG. 1 to FIG. 8.

The memory 530 and the storage device 560 may include various types of volatile or nonvolatile storage media. For example, the memory may include read-only memory (ROM) 531 and random access memory (RAM) 532. In an embodiment of the present disclosure, the memory 530 may be located inside or outside the processor 510, and the memory 530 may be connected to the processor 510 through various known means.

In addition, at least some of an object detection system and an object detection method according to embodiments of the present disclosure may be implemented as a program or software executed on the computing device 500, and the program or software may be stored in a computer-readable medium.

In addition, at least some of an object detection system and an object detection method according to embodiments of the present disclosure may be implemented with hardware that can be electrically connected to the computing device 500.

According to the embodiments of the present disclosure described so far, by performing object detection and segmentation based on points without using a predefined anchor box that requires a high computational amount and memory usage, it is possible to achieve efficiency in terms of computational amount and memory occupancy. Furthermore, it is possible to implement real-time object detection and segmentation in various fields based on platforms with little computing power (for example, embedded platforms) such as fields of robots, drones, and autonomous vehicles.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An object detection system, comprising:
 a processor,
 a feature map extractor configured to receive, via the processor, an image for object detection and extract a feature map having multiple resolutions for the image;
 a bounding box detector configured to classify, via the processor, a bounding box by applying a first group of convolutional layers to the feature map, and predict the bounding box by applying a second group of convolutional layers to the feature map; and
 a mask generator configured to generate, via the processor, a mask for the shape of the object in the bounding box using the feature map,
 wherein the mask generator:
 obtains a convolutional feature map by applying a convolutional layer to a warped feature map, and combines a maximum pooling feature map and an average pooling feature map by performing maximum pooling and average pooling on the convolutional feature map,
 obtains an attention map by applying a nonlinear function to the combined maximum pooling feature map and average pooling feature map, and
 multiplies the attention map and the convolutional feature map, and performs a binary classification on the multiplied result to generate the mask.

2. The system of claim 1, wherein:
the feature map extractor constructs a feature pyramid that combines information of feature maps for each of multiple layers from the image, and extracts the feature map having the multiple resolutions by using the feature pyramid.

3. The system of claim 2, wherein:
the feature map extractor extracts the feature maps for each of the multiple layers from a backbone network, and generates the feature pyramid by adding the extracted feature maps for each of the multiple layers in reverse order.

4. The system of claim 1, wherein:
the bounding box detector classifies the bounding box using a binary classifier.

5. The system of claim 1, wherein:
the bounding box detector sets offsets in multiple directions based on the center point of the object and then estimates the position and the size of the bounding box.

6. The system of claim 5, wherein:
the bounding box detector adjusts the reliability of the predicted bounding box based on the confidence score for the classification of the bounding box and the centeredness indicating the degree to which the predicted bounding box coincides with the ground truth (GT).

7. The system of claim 1, wherein:
the mask generator extracts an area corresponding to the bounding box from the feature map, and then performs warping with a feature map having a preset resolution.

8. An object detection method, comprising:
receiving an image for object detection;
extracting feature maps for each of multiple layers from a backbone network;
generating a feature pyramid that combines information of feature maps for each of multiple layers by adding the extracted feature maps for each of the multiple layers in reverse order;
extracting a feature map having multiple resolutions for the image by using the feature pyramid; and
generating a mask for the shape of the object using the feature map having multiple resolutions,
wherein the generating the mask comprises:
 obtaining a convolutional feature map by applying a convolutional layer to a warped feature map;
 combining a maximum pooling feature map and an average pooling feature map by performing maximum pooling and average pooling on the convolutional feature map;
 obtaining an attention map by applying a nonlinear function to the combined maximum pooling feature map and average pooling feature map; and multiplying the attention map and the convolutional feature map, and performing a binary classification on the multiplied result to generate the mask.

9. The method of claim 8, wherein
the generating the mask further comprises:
extracting an area corresponding to the bounding box from the feature map, and performing warping with a feature map having a preset resolution.

10. An object detection method, comprising:
applying a first group of convolutional layers to a feature map of an image for object detection;
classifying the bounding box using a binary classifier;
applying a second group of convolutional layers to the feature map;
setting offsets in multiple directions based on the center point of the object and estimating the position and the size of the bounding box;
adjusting the reliability of the predicted bounding box based on the confidence score for the classification of the bounding box and the centeredness indicating the degree to which the predicted bounding box coincides with the ground truth (GT); and
generating a mask for the shape of the object in the bounding box using the feature map,
wherein the generating the mask comprises:
obtaining a convolutional feature map by applying a convolutional layer to the warped feature map;
combining a maximum pooling feature map and an average pooling feature map by performing maximum pooling and average pooling on the convolutional feature map;
obtaining an attention map by applying a nonlinear function to the combined maximum pooling feature map and average pooling feature map; and
multiplying the attention map and the convolutional feature map, and performing a binary classification on the multiplied result to generate the mask.

11. The method of claim 10, wherein
the generating the mask further comprises:
extracting an area corresponding to the bounding box from the feature map, and performing warping with a feature map having a preset resolution.

* * * * *